United States Patent
Dunford et al.

(10) Patent No.: US 9,855,981 B1
(45) Date of Patent: Jan. 2, 2018

(54) VEHICLE ACTIVE SIDE VENT SYSTEM (71) Applicant: SRG Global Inc., Warren, MI (US)

(72) Inventors: David Michael Dunford, Canton, MI (US); Patrick Ayoub, Bloomfield Hills, MI (US); Rob Frayer, Huntington Woods, MI (US)

(73) Assignee: SRG GLOBAL INC., Troy, MI (US)

( * ) Notice: Subject to any disclaimer, the term of this patent is extended or adjusted under 35 U.S.C. 154(b) by 0 days.

(21) Appl. No.: 15/185,332

(22) Filed: Jun. 17, 2016

(51) Int. Cl.
  *B60J 9/00* (2006.01)
  *B62D 35/00* (2006.01)
  *B60K 11/08* (2006.01)

(52) U.S. Cl.
  CPC ............ *B62D 35/00* (2013.01); *B60K 11/085* (2013.01); *B62D 35/005* (2013.01); *B62D 35/008* (2013.01)

(58) Field of Classification Search
  CPC ........ B60K 11/085; B60K 1/04; B62D 35/00; F24F 13/082; F24F 7/02; B60H 1/248; H01L 2924/0002; B25D 11/125; B25D 17/06
  USPC .................. 296/180.1; 180/68.1, 68.2, 68.3; 454/155, 152, 141, 143, 164
  See application file for complete search history.

(56) References Cited

U.S. PATENT DOCUMENTS

| | | | |
|---|---|---|---|
| 2,965,014 A * | 12/1960 | Charley | F24F 11/053 454/256 |
| 3,228,318 A * | 1/1966 | Wheatley | E06B 7/084 137/601.08 |
| 4,915,023 A * | 4/1990 | Porter | E06B 7/082 403/401 |
| 5,293,920 A * | 3/1994 | Vagedes | E06B 7/084 160/104 |
| 5,482,507 A * | 1/1996 | Priest | F24F 13/075 34/235 |
| 5,727,998 A | 3/1998 | Krueger et al. | |
| 5,730,652 A * | 3/1998 | Van Becelaere | F24F 11/04 137/12 |
| 6,338,677 B1 * | 1/2002 | White | F24F 11/0001 454/256 |
| 6,439,328 B1 | 8/2002 | Vaillancourt et al. | |
| 7,207,851 B1 | 4/2007 | Gibbs et al. | |
| 7,213,667 B2 | 5/2007 | Goebert et al. | |

(Continued)

FOREIGN PATENT DOCUMENTS

DE    3834119 A1    4/1990
DE    10213188 A1   10/2003

(Continued)

OTHER PUBLICATIONS

PCT International Search Report and Written Opinion dated Jul. 26, 2017 for PCT International Application No. PCT/US2017/031902 (14 pages).

*Primary Examiner* — Kiran B Patel
(74) *Attorney, Agent, or Firm* — RMCK Law Group, PLC (57) ABSTRACT

An active side vent system for a vehicle can include a housing disposed in a side vent opening defined by a recessed surface in a rear portion of a front fender of the vehicle, a set of louvers disposed in the housing and configured to pivot such that (i) in an open position, none of the set of louvers extends beyond an outer surface of the front fender and (ii) in a closed position, the set of louvers are substantially flush with the recessed surface of the front fender, and an actuator configured to control the pivoting of the set of louvers.

8 Claims, 5 Drawing Sheets

(56) References Cited

U.S. PATENT DOCUMENTS

| | | | |
|---|---|---|---|
| 7,258,383 B2 | 8/2007 | Pfister et al. | |
| 7,399,027 B2 | 7/2008 | Woodhouse et al. | |
| 7,559,391 B2 | 7/2009 | Bradley et al. | |
| 8,347,830 B2 | 1/2013 | Tregnago et al. | |
| 8,347,994 B2 * | 1/2013 | Bering | F01P 5/06 |
| | | | 180/68.1 |
| 8,479,853 B2 * | 7/2013 | Verbrugge | B62D 25/12 |
| | | | 180/68.2 |
| 8,505,660 B2 * | 8/2013 | Fenchak | B60K 11/085 |
| | | | 180/68.1 |
| 8,544,581 B2 | 10/2013 | Stokes et al. | |
| 8,622,162 B2 | 1/2014 | Karl | |
| 8,662,569 B2 | 3/2014 | Klop | |
| 8,667,931 B2 | 3/2014 | Kerns | |
| 8,752,886 B2 * | 6/2014 | Wirth | B60K 11/085 |
| | | | 180/68.6 |
| 8,807,166 B2 * | 8/2014 | Charnesky | B60K 11/085 |
| | | | 137/601.08 |
| 9,150,097 B2 | 10/2015 | Gustavo et al. | |
| 9,216,644 B2 * | 12/2015 | Cardile | B60H 1/241 |
| 9,254,742 B2 * | 2/2016 | Chappex | B60K 11/085 |
| 9,272,613 B2 | 3/2016 | Kaita et al. | |
| 9,556,783 B2 * | 1/2017 | Sigurdson | B60K 11/085 |
| 2006/0073781 A1 * | 4/2006 | Mochizuki | B60H 1/3421 |
| | | | 454/152 |
| 2010/0243352 A1 * | 9/2010 | Watanabe | B60K 11/085 |
| | | | 180/68.1 |
| 2011/0070817 A1 * | 3/2011 | Walters | B60K 11/085 |
| | | | 454/155 |
| 2012/0323448 A1 * | 12/2012 | Charnesky | B60K 11/085 |
| | | | 701/49 |
| 2013/0309956 A1 * | 11/2013 | Mouch | B60H 1/249 |
| | | | 454/165 |
| 2014/0370795 A1 * | 12/2014 | Klop | B60H 1/242 |
| | | | 454/75 |
| 2015/0041229 A1 * | 2/2015 | Maurer | B60K 11/06 |
| | | | 180/68.1 |
| 2015/0152774 A1 * | 6/2015 | Ritz | F01P 1/06 |
| | | | 454/155 |
| 2015/0321548 A1 * | 11/2015 | Hori | B60K 11/04 |
| | | | 180/68.1 |
| 2016/0016617 A1 | 1/2016 | Wolf | |
| 2016/0096425 A1 * | 4/2016 | Walters | B60K 11/085 |
| | | | 180/68.1 |
| 2017/0144710 A1 * | 5/2017 | Frayer | B62D 25/082 |

FOREIGN PATENT DOCUMENTS

| | | |
|---|---|---|
| DE | 102008019923 A1 | 10/2009 |
| DE | 102014103035 A1 | 5/2015 |
| DE | 102014106264 A1 | 11/2015 |
| FR | 2897833 A3 | 8/2007 |
| FR | 2934825 B1 | 9/2010 |
| FR | 3022878 A | 1/2016 |
| GB | 2528923 A | 2/2016 |
| GB | 2528925 A | 2/2016 |
| JP | 2013060845 A | 4/2013 |

* cited by examiner

VEHICLE ACTIVE SIDE VENT SYSTEM

FIELD

The present disclosure generally relates to vehicle active aerodynamic systems and, more particularly, to an active side vent system for a vehicle.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A vehicle can be propelled by a powertrain (e.g., an engine, an electric motor, or a combination thereof) that generates drive torque. In some implementations, the powertrain can be arranged in a front compartment of the vehicle underneath a hood. During operation, the powertrain can generate a large amount of heat. To prevent overheating of the powertrain and potential damage to other components in the powertrain compartment, a cooling system can be implemented. One example component of the cooling system is a heat transfer device, such as a radiator. Air can flow through openings of a grille system at a front of the compartment to cool the radiator. Such conventional cooling systems, however, may be inadequate at particular operation conditions (e.g., when the vehicle is traveling at high speeds).

SUMMARY

According to a first aspect of the present disclosure, an active side vent system for a vehicle is presented. In one exemplary implementation, the system can include a housing disposed in a side vent opening defined by a recessed surface in a rear portion of a front fender of the vehicle; a set of louvers disposed in the housing and configured to pivot such that (i) in an open position, none of the set of louvers extends beyond an outer surface of the front fender and (ii) in a closed position, the set of louvers are substantially flush with the recessed surface of the front fender; and an actuator configured to control the pivoting of the set of louvers.

In some implementations, the recessed surface defines a variable depth that decreases from a maximum recess depth at a point towards a front of the vehicle in a direction towards a rear of the vehicle. In some implementations, each louver of the set of louvers comprises a pivot shaft and a blade, and wherein each blade is coupled to its respective pivot shaft at non-central point.

In some implementations, the system further includes a duct configured to direct airflow from an air source to the side vent opening, wherein the airflow exits the vehicle when the set of louvers are in the open position. In some implementations, the air source is a powertrain compartment of the vehicle. In some implementations, the side vent opening is defined in an upper portion of the rear portion of the front fender of the vehicle. In some implementations, the air source is a wheel well of the vehicle. In some implementations, the side vent opening is defined in a lower portion of the rear portion of the front fender of the vehicle.

According to a second aspect of the present disclosure, an active side vent system for a vehicle is presented. In one exemplary implementation, the system can include a first active side vent subsystem associated with a first side of the vehicle and comprising: a first housing disposed in a first side vent opening defined by a first recessed surface in a first rear portion of a first front fender of the vehicle, and a first set of louvers disposed in the first housing and configured to pivot such that (i) in an open position, none of the first set of louvers extends beyond a first outer surface of the first front fender and (ii) in a closed position, the first set of louvers are substantially flush with the first recessed surface of the first front fender; a second active side vent subsystem associated with an opposing second side of the vehicle and comprising: a second housing disposed in a second side vent opening defined by a second recessed surface in a second rear portion of a second front fender of the vehicle, and a second set of louvers disposed in the second housing and configured to pivot such that (i) in an open position, none of the second set of louvers extends beyond a second outer surface of the second front fender and (ii) in a closed position, the second set of louvers are substantially flush with the second recessed surface of the second fender; and an actuator configured to control the pivoting of both the first and second sets of louvers.

In some implementations, the actuator is configured to control the pivoting of the first set of louvers, and further comprising a linkage connected between the one of the actuator and the first set of louvers such that the linkage controls pivoting of the second set of louvers. In some implementations, the system further includes first and second ducts configured to direct airflow from at least one air source to the first and second side vent openings, respectively, wherein the airflow exits the vehicle when the first and second sets of louvers are in the open position.

In some implementations, the at least one air source is first and second wheel wells of the vehicle. In some implementations, each duct is coupled to an opening defined in a wall of its respective wheel well, and the system further includes a mesh screen disposed in each wall opening. In some implementations, the first side vent opening is defined in a first lower portion of the first rear portion of the first front fender, and wherein the second side vent opening is defined in a second lower portion of the second rear portion of the second front fender. In some implementations, the at least one air source is a powertrain compartment of the vehicle. In some implementations, the first side vent opening is defined in a first upper portion of the first rear portion of the first front fender, and wherein the second side vent opening is defined in a second upper portion of the second rear portion of the second front fender.

According to a third aspect of the present disclosure, an airflow control system for a vehicle is presented. In one exemplary implementation, the system can include a front active grille shutter (AGS) system comprising: a first housing disposed in a front grille opening of the vehicle, and a first set of louvers disposed in the front grille opening and configured to pivot between (i) an open position during which air flows through the front grille opening and into a powertrain compartment of the vehicle and (ii) a closed position during which airflow through the front grille opening and into the powertrain compartment is mitigated; a first active side vent subsystem comprising: a second housing disposed a first side vent opening defined by a first recessed surface in a first rear portion of a first front fender of the vehicle, and a second set of louvers disposed in the second housing and configured to pivot such that (i) in an open position, none of the second set of louvers extends beyond a first outer surface of the first front fender and (ii) in a closed position, the second set of louvers are substantially flush with the first recessed surface of the first front fender;

and an actuator system configured to control the pivoting of both the first and second sets of louvers.

In some implementations, the actuator system comprises distinct first and second actuators associated with the front AGS system and the first active side vent system, respectively. In some implementations, the actuator system comprises a single actuator that is connected to one of the front AGS system and the first active side vent system, and further comprising a linkage connected between the single actuator and the other of the front AGS system and the active side vent system.

In some implementations, the system further includes a second active side vent system that is associated with an opposite side of the vehicle than the first active side vent system and comprising: a third housing disposed in a second side vent opening defined by second recessed surface in a second rear portion of a second front fender of the vehicle, and a third set of louvers disposed in the third housing and configured to pivot such that (i) in an open position, none of the third set of louvers extends beyond a second outer surface of the second front fender and (ii) in a closed position, the third set of louvers are substantially flush with the second recessed surface of the second front fender, wherein the actuator system is further configured to control the pivoting of the third set of louvers.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

As previously mentioned, operation of a powertrain of a vehicle can cause a large build-up of heat in its powertrain compartment (e.g., under a hood of the vehicle). Conventional cooling components, such as a radiator, are configured to provide cool air to the powertrain compartment. These conventional cooling components, however, may be inadequate for preventing or mitigating heat build-up in the powertrain compartment, particularly at certain operating conditions (e.g., when the vehicle is traveling at high speeds, such as on a highway or expressway). Accordingly, a vehicle active side vent system is presented.

The active side vent system can be disposed in a side vent opening defined in a rear portion of a front fender of the vehicle. The active side vent system can include louvers that are recessed from a surface of the front fender for aerodynamic purposes. In one configuration, the active side vent system can be configured to vent air from the powertrain compartment. In another configuration, the active side vent system can be configured to vent air from a wheel well of the vehicle. It will be appreciated that the term "front fender" as used herein can also refer to both (i) a front quarter panel of the vehicle and (ii) a side panel of the vehicle that is arranged between a front fascia and a front door of the vehicle (e.g., behind a front wheel/tire of the vehicle).

Figure 1A:
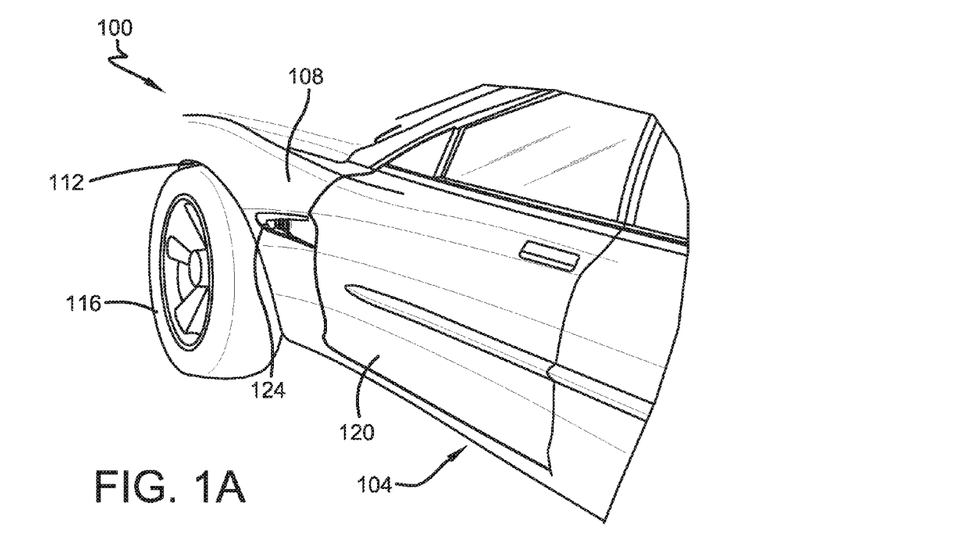
FIGS. 1A-1B depict rear perspective views of different configurations of an example vehicle active side vent system according to some implementations of the present disclosure.
Figure 1B:
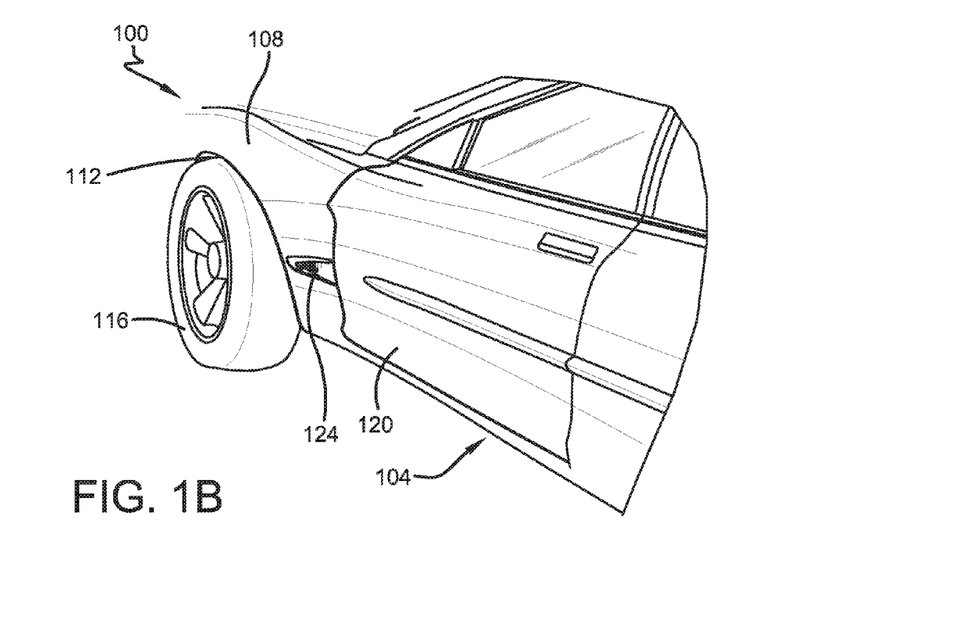

Referring now to FIGS. 1A-1B, rear perspective views of a vehicle 100 are illustrated. The vehicle 100 has a side portion 104 that includes a front fender 108. The side portion 104 also includes a wheel well 112 partially surrounding a wheel/tire 116 of the vehicle 100. An active side vent system 124 can be disposed in a rear portion of the front fender 108 between the wheel well 112 and a front door 120 of the side portion 104 of the vehicle 100. In a first configuration of FIG. 1A, the active side vent system 124 is disposed in an upper portion of the rear portion of the front fender 108. In a second configuration of FIG. 1B, the active side vent system 124 is disposed in a lower portion of the rear portion of the front fender 108.

Figure 2A:
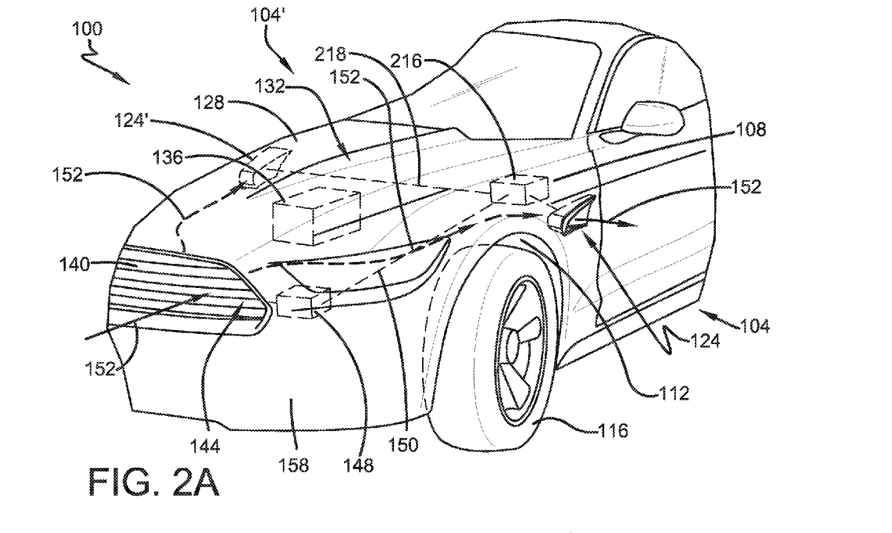
FIGS. 2A-2B depict front perspective views of the different configurations of the example active side vent system according to some implementations of the present disclosure.
Figure 2B:
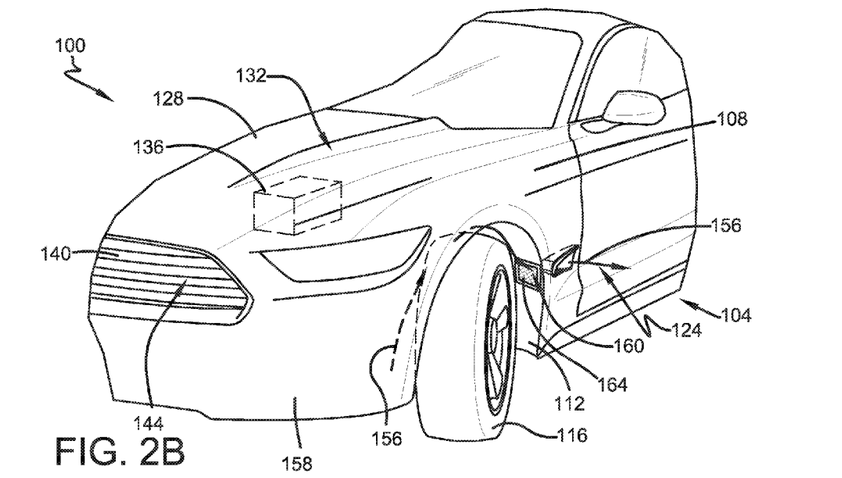

Referring now to FIGS. 2A-2B, front perspective views of the vehicle 100 are illustrated. Underneath a hood 128 of the vehicle 100 is a powertrain compartment 132. A controller 136, such as an engine control unit (ECU), can be disposed in the powertrain compartment 132. A powertrain (not shown), such as an engine, an electric motor, or a combination thereof, can also be disposed in the powertrain compartment 132. The controller 136 can control operation of the powertrain (not shown) as well as the active side vent system 124. Air can be drawn into the powertrain compartment 132 through a front grille 140 with a louver system 144. In one exemplary implementation, the louver system 144 is an AGS system in that it is controlled by an actuator 148 that is in turn controlled by the controller 136, but it will be appreciated that the louver system 144 could alternatively comprise fixed louvers (i.e., a non-AGS system). The actuator 148 could be optionally connected via a linkage 150 to another actuator 216 associated with the active side vent system 124, which is discussed in greater detail below. A configuration of the linkage 150 can depend on a relative positioning of the actuators 148, 216 with respect to each other. Non-limiting examples of the linkage 150 include a mechanical link, a molded part, and a push-pull cable. The actuators 148, 216 could also be a single actuator.

In FIG. 2A, a first air path 152 is defined as entering the powertrain compartment 132 through the front grille 140 and exiting the powertrain compartment 132 through the active side vent system 124 when it is opened. This first air path 152 can also represent a duct (a pipe, a tube, etc.) configured to route airflow from the front grille 140 or from inside the powertrain compartment 132 and to the active side vent system 124. In FIG. 2B, a second air path 156 is defined as entering the wheel well 112 from the side or from the front (e.g., underneath a front bumper 158) of the vehicle 100 and exiting the wheel well 112 through an opening 160 in the wheel well opening (e.g., with a mesh screen 164 optionally disposed therein) and then out the active side vent system 124 when it is opened. Similarly, this second air path 156 can also represent a duct (a pipe, a tube, etc.) configured to route airflow from the wheel well opening 160 to the active side vent system 124.

The configuration of FIG. 2A can correspond to the first configuration of FIG. 1A where the active side vent system 124 is disposed in an upper portion of the rear portion of the front fender 108. The configuration of FIG. 2B, on the other hand, can correspond to the second configuration of FIG. 1B where the active side vent system 124 is disposed in a lower portion of the rear portion of the front fender 108. It will be appreciated, however, that the configuration of FIG. 2B (air path 156 through the wheel well 112, the opening 160, and the optional mesh screen 164) could be associated with the positioning of active side vent system 124 of FIG. 1A (the upper portion of the rear portion of the front fender 108). Similarly, it will be appreciated that the configuration of FIG. 2A (air path 152 through the front grille 140 and the powertrain compartment 132) could be associated with the positioning of the active side vent system 124 of FIG. 1B (the lower portion of the rear portion of the front fender 108).

Figure 3A:
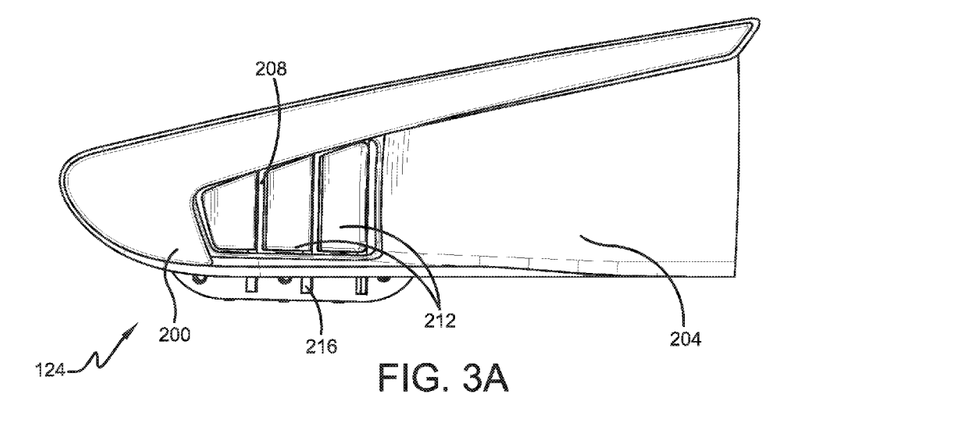
FIGS. 3A-3B depict different front side views of the example active side vent system according to some implementations of the present disclosure.
Figure 3B:
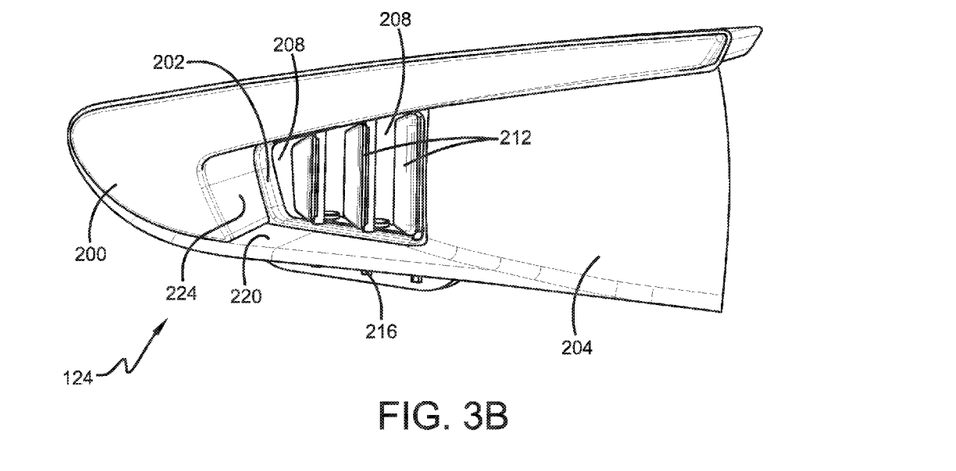

Referring now to FIGS. 3A-3B, front side views of the active side vent system 124 are illustrated. The front fender 108 defines both an outer surface 200 and a recessed surface 204. In one exemplary implementation, the recessed surface 204 defines a variable depth that decreases from a maximum recess depth defined by surfaces 220, 224 at a point towards the front of the vehicle 100 in a direction towards a rear of the vehicle 100. At some point, the recessed surface 204 merges with the outer surface 200 of the front fender 108 (e.g., a depth of zero). The recessed surface 204 can define a side vent opening 208 in which a housing 202 of the active side vent system 124 is disposed. A set of louvers 212 can be disposed in the housing 202 and can be configured to pivot such that (i) in an open position, none of the louvers 212 extend beyond the outer surface 200 of the front fender 108 and (ii) in a closed position, the louvers 212 are substantially flush with the recessed surface 204.

Such a configuration may provide for improved aerodynamics. For example, as shown in FIG. 3B, the louvers 212 can rotate in a clockwise direction such that air can be vented from a front portion of the vehicle 100 (e.g., the powertrain compartment). The actuator 216 previously discussed herein are configured to be controlled by the controller 136 in order to rotatable drive the louvers 212 opened/closed. Examples of the actuator 216 include, but are not limited to, electric motors, drive shafts, drive gears, and combinations thereof. In some implementations, sets of the louvers 212 could be driven independently of each other as opposed to being driven uniformly. While single actuators 148, 216 are shown and discussed herein, it will be appreciated that multiple actuators could be utilized to collectively drive each system.

Figure 4A:
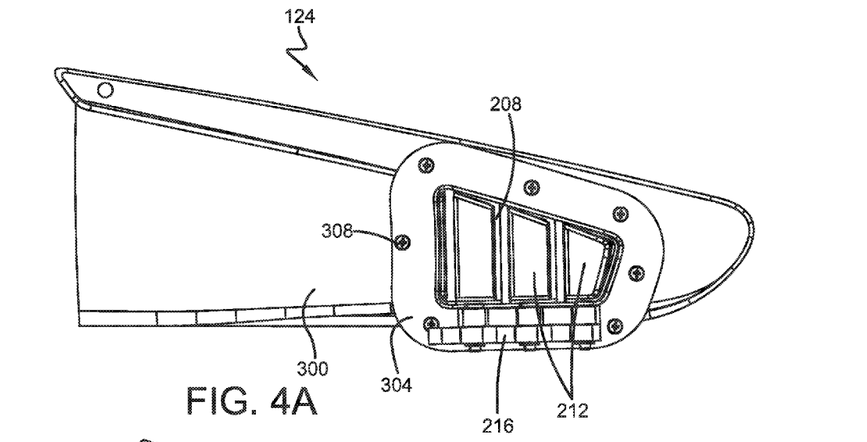
FIGS. 4A-4C depict different rear side views of the example active side vent system according to some implementations of the present disclosure.
Figure 4B:
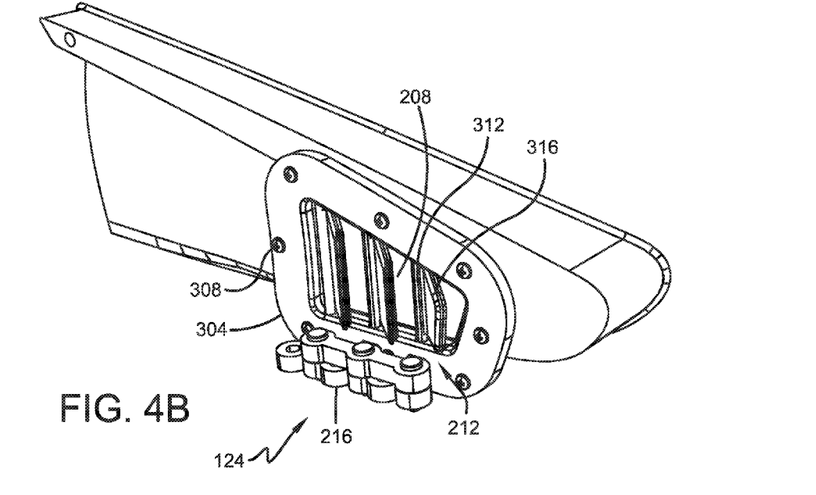
Figure 4C:
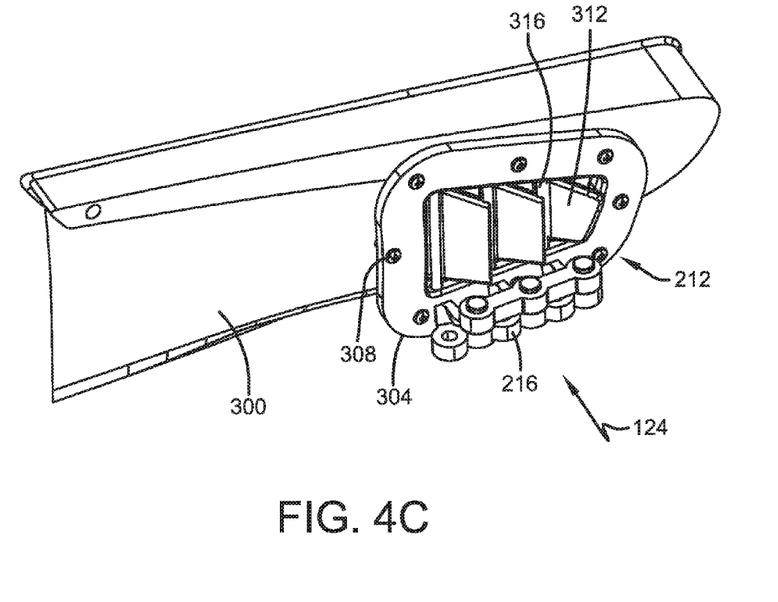

Referring now to FIGS. 4A-4C, rear side views of the active side vent system 124 are illustrated. The front fender 108 further defines an inner surface 300 having a mounting assembly 304 connected thereto via mounting devices 308 (e.g., screws). This device 304 can at least partially house the louvers 212 and therefore may be part of the housing 202. Each louver 212 can include a pivot shaft 312 and a blade 316. The blade 316 can be coupled to its respective pivot shaft 312 at a non-central point of the blade 316 as shown. This can enable the louvers 212 to rotate primarily inwardly in order to avoid any of the louvers 212 extending beyond the outer surface 200 of the front fender 108 for aerodynamic purposes. For example only, the pivot shaft 312 could be coupled to an end of the blade 316. It will be appreciated, however, that other configurations of the pivot shaft 312 and the blade 316 can be utilized, such as a centralized configuration of the pivot shaft 312 with respect to the blade 316.

The controller 136 can be configured to control the actuator 216 in a variety of ways. Example control parameters include vehicle speed and temperatures (ambient temperature, powertrain temperature, powertrain compartment temperature, brake temperature, etc.), but it will be appreciated that any suitable parameters can be used in controlling the active side vent system 124. In one implementation, the controller 136 may control the actuator 216 to close the set of louvers 212 at vehicle speeds greater than a high speed threshold. This high speed threshold could be, for example, a highway speed at which optimal aerodynamics (i.e., a closed active side vent system 124) are desired. This may be desired for both the upper configuration (powertrain compartment venting) and the lower configuration (wheel well venting). In one implementation, the controller 136 may control the actuator 216 to open the set of louvers (a) after a period at vehicle speeds greater than the high speed threshold and (b) when the vehicle has slowed to less than a low speed threshold. This low speed threshold could be, for example, a few miles per hour, such as when the vehicle has exited the highway/expressway and is slowing to near a stop on an off-ramp or at a traffic light. This can be a good time to open the active side vent system 124 to expel heat that was just generated during the high speed operation of the vehicle 100.

As previously mentioned, coordinated or concurrent control of both actuator 148 and actuator 216 could also be performed. Thus, their associated systems could be referred to as subsystems 144 and 124 that are both part of a larger active airflow control system. This control method could be performed by controlling both actuators 148, 216 or by controlling one of the actuators 148, 216, the other of which would then also be controlled by the optional linkage 150. In some implementations, there may be only one actuator 148 or 216 and the linkage 150 could be implemented to directly control the other set of louvers 144, 212 not directly associated with the one actuator 148 or 216. In one exemplary implementation, the louvers 144 of the front grille 140 could be similarly closed at high vehicle speeds and then subsequently opened at low vehicle speeds to increase the airflow through the powertrain compartment 132 and out of the active side vent system 124, thereby providing for improved cooling.

Similarly, and referring again to FIG. 2A, a second active side vent system 124' could be associated with an opposing side portion 104' of the vehicle 100. This second active side vent system 124' could have the same or similar configuration as the active side vent system 124. One example difference could be the configuration of the duct leading to the respective active side vent systems 124, 124', which may need to be different based on a configuration of components (e.g., in the powertrain compartment 132). The active side vent systems 124, 124' could both be driven by the actuator 216 or two distinct/separate actuators. In one exemplary implementation, one of the active side vent systems 124, 124' could be driven by the actuator 216, and a linkage 218 could be connected between (i) one of the actuator 216 and the louvers of the one of the active side vent systems 124, 124' and (ii) the louvers of the other of the active side vent systems 124, 124'. Distinct or separate actuators could also be implemented, although the same (i.e., coordinated) control of both systems 124, 124' may be desired for optimal venting and easier design/implementation. The front AGS system 144 could also be implemented with this dual active side vent configuration. The front AGS system 144 could be similarly driven via the same actuator 216 as the active side vent systems 124, 124' (e.g., via the linkage 150) or via its own distinct actuator 148.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An active side vent system for a vehicle, the system comprising:
   a housing disposed in a side vent opening defined by a recessed surface in a rear portion of a front fender of the vehicle;
   a set of louvers disposed in the housing and configured to pivot such that (i) in an open position, none of the set of louvers extends beyond an outer surface of the front fender and (ii) in a closed position, the set of louvers are substantially flush with the recessed surface of the front fender; and
   an actuator configured to control the pivoting of the set of louvers.

2. The system of claim 1, wherein the recessed surface defines a variable depth that decreases from a maximum recess depth at a point towards a front of the vehicle in a direction towards a rear of the vehicle.

3. The system of claim 1, wherein each louver of the set of louvers comprises a pivot shaft and a blade, and wherein each blade is coupled to its respective pivot shaft at non-central point.

4. The system of claim 1, further comprising a duct configured to direct airflow from an air source to the side vent opening, wherein the airflow exits the vehicle when the set of louvers are in the open position.

5. The system of claim 4, wherein the air source is a powertrain compartment of the vehicle.

6. The system of claim 5, wherein the side vent opening is defined in an upper portion of the rear portion of the front fender of the vehicle.

7. The system of claim 4, wherein the air source is a wheel well of the vehicle.

8. The system of claim 7, wherein the side vent opening is defined in a lower portion of the rear portion of the front fender of the vehicle.

* * * * *